(12) United States Patent
Vits et al.

(10) Patent No.: US 6,485,098 B1
(45) Date of Patent: *Nov. 26, 2002

(54) RESTRAINT SYSTEM FOR A SCHOOL BUS SEAT

(75) Inventors: Charles G. Vits, Carmel, IN (US); Christopher W. Foye, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/734,361

(22) Filed: Dec. 11, 2000

Related U.S. Application Data

(63) Continuation of application No. 09/479,197, filed on Jan. 7, 2000, which is a continuation-in-part of application No. 09/183,088, filed on Oct. 30, 1998, now Pat. No. 6,123,388.

(51) Int. Cl.[7] .............................. B60N 2/42; B60R 21/00
(52) U.S. Cl. .................. 297/216.13; 297/483; 297/487
(58) Field of Search ...................... 297/216.13, 216.14, 297/483, 468, 464, 452.2, 232, 216.1, 487, 488

(56) References Cited

U.S. PATENT DOCUMENTS

| | | | |
|---|---|---|---|
| 4,784,352 A | * | 11/1988 | Smith et al. ............ 297/216.13 |
| 4,919,488 A | | 4/1990 | Deegener et al. |
| 5,015,010 A | | 5/1991 | Homeier et al. |
| 5,246,271 A | | 9/1993 | Boisset |
| 5,468,044 A | * | 11/1995 | Coman .................. 297/216.13 |
| 5,575,533 A | | 11/1996 | Glance |
| 5,641,198 A | * | 6/1997 | Steffens, Jr. ........... 297/216.13 |
| 5,645,316 A | * | 7/1997 | Aufrere et al. ......... 297/216.13 |
| 5,746,476 A | | 5/1998 | Novak et al. |
| 5,782,537 A | | 7/1998 | Leistra et al. |
| 5,823,627 A | | 10/1998 | Viano et al. |
| 5,882,072 A | * | 3/1999 | Morlock ............ 297/216.13 X |
| 6,003,937 A | | 12/1999 | Dutton et al. |
| 6,050,637 A | * | 4/2000 | Haland et al. ...... 297/216.14 X |

* cited by examiner

*Primary Examiner*—Anthony D. Barfield
(74) *Attorney, Agent, or Firm*—Barnes & Thornburg

(57) ABSTRACT

A passenger restraining harness and support assembly for use with a bench seat mounted in a vehicle. The bench seat includes a frame having a seat support portion with a front portion and a rear portion, a seatback portion coupled to the seat support portion, and legs or supports anchoring the seat to the vehicle. A harness support assembly includes a tower member with a slotted bottom end pivotally coupled to the rear of the seat support, a connecting member having one end adapted to fit into the slot in the tower member and a second end connected to the front of the seat support portion, a belt guide connected to the top of the tower member, and an anchor wing connected to the connecting member. A belt or harness attaches to the support assembly.

20 Claims, 19 Drawing Sheets

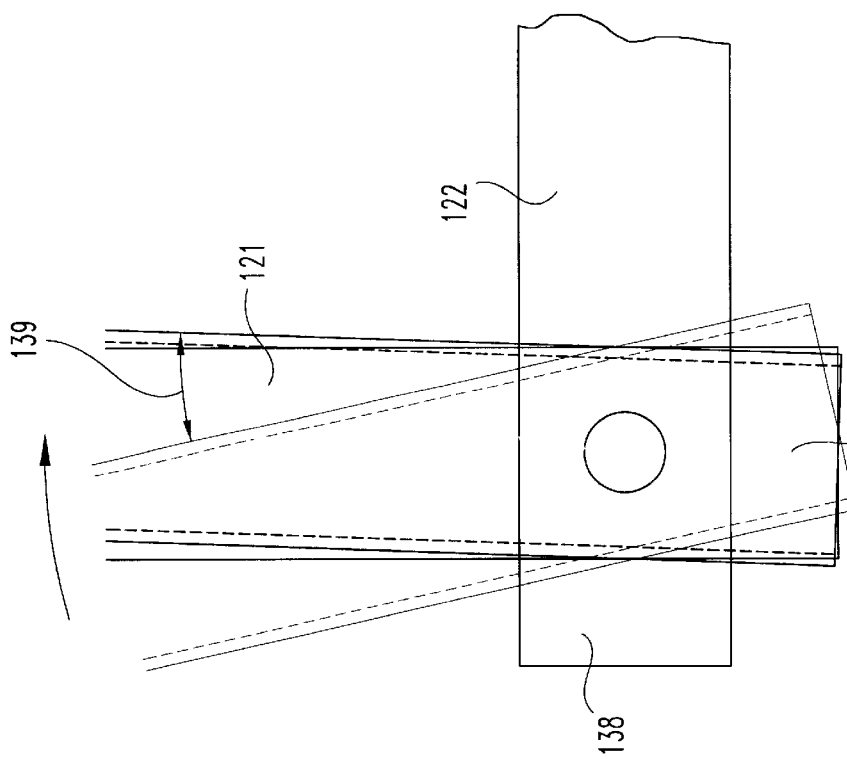
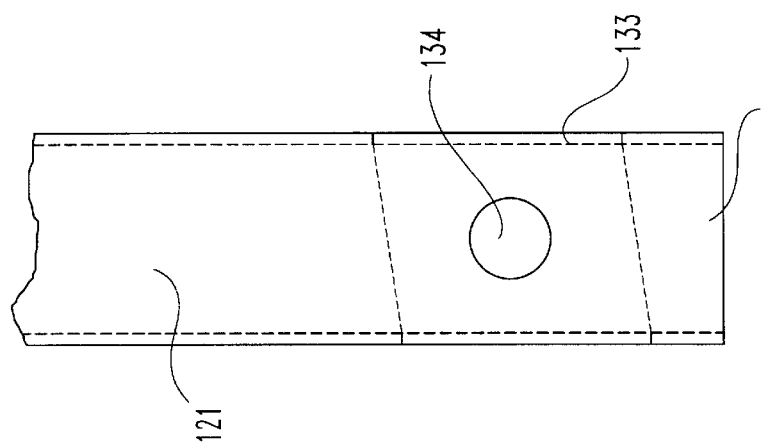
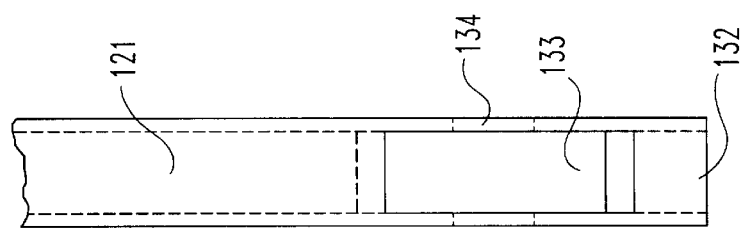
Fig. 3c
Fig. 3b
Fig. 3a

RESTRAINT SYSTEM FOR A SCHOOL BUS SEAT

CROSS-REFERENCE TO RELATED APPLICATIONS

This is a continuation of co-pending U.S. patent application Ser. No. 09/479,197 filed Jan. 7, 2000, and titled Restraint System for a School Bus Seat. U.S. Ser. No. 09/479,197 is a continuation-in-part of U.S. Ser. No. 09/183,088 filed Oct. 30, 1998, and titled Restraint System for a School Bus Seat, now U.S. Pat. No. 6,123,388. The disclosures of these prior applications are hereby incorporated herein by reference.

FIELD OF THE INVENTION

The present invention is in the field of seat belts used to provide a protective passenger environment.

DESCRIPTION OF THE PRIOR ART

Conventional seat belt systems combining a lap belt and an upper torso belt are well known. These three-point restraint systems are usually used with seats offering rigid support for the belts. As typically used in a vehicle, the three-point restraint system consists of single belt having its opposite ends mounted to a pair of retractors with a seat belt tongue connected to the belt intermediate to the belt ends. The tongue may be swung across the person and engaged with a buckle affixed to the seat thereby positioning one portion of the belt across the lap and another portion of the belt across the upper torso. In some systems, only one end of the belt is mounted to a retractor while the other end is anchored to the seat or vehicle. Seat belts are active restraint devices, requiring a passenger to actively engage the restraints for them to be effective.

School bus passenger seats usually do not employ active restraint safety devices, but instead rely on a passive restraint seat design. School bus passenger seats are built to specifications conforming to the safety standards set by the National Highway Traffic Safety Administration, DOT. These are codified as 49 C.F.R. Ch. V, .sctn. 571.222, Standard No. 222, and require that the seat back bend or deflect forward when a force is applied to the rear of the seat back. The code further specifies that 4000 W inch-pounds of energy must be absorbed within a maximum forward deflection of the seat back of 14 inches and 2800 W inch-pounds be absorbed within a maximum rearward deflection of the seat back of 10 inches where W represents the number of seating positions for which the seat is designed. 49 C.F.R., Ch. V, .sctn. 571.222, S5.1.3–5.1.4. The code specifies a passive restraint system, and does not require any sort of active restraints, such as a two-point passenger restraining lap belt or a three-point passenger restraining lap belt and torso harness combination. Children riding the school bus are protected in head-on collisions by the seat back in front of them deflecting forward and absorbing some of their forward momentum.

Vehicles with deforming or deflecting seats provide special problems regarding the integration of active restraint seat belt systems. Passive restraint systems are designed to protect a passenger who has been thrown forward by having the impacted seat back deflect upon impact of the thrown passenger and absorb some of their momentum. In a school bus seat combining active and passive restraint systems, both of the restraint systems have to be able to perform their functions and the seat must still conform to the regulations set forth in 49 C.F.R.

In U.S. Pat. No. 5,746,476, there is disclosed an automotive seat having a tower frame associated with the harness to transmit impact loads to the floor. Despite the prior devices, there is still a need for increased protection for children riding the school bus in an emergency or crash situation. The addition of an active restraint system, such as a three-point lap belt and torso harness combination, would provide enhanced passenger protection in a head-on crash as well as providing passenger protection in a broadside collision and/or roll situation. Disclosed herein is a three-point lap belt and torso harness passenger restraint system that is compatible with the pivoting and deflecting seats required by 49 C.F.R.

A further need is to provide a restraint system for a school bus seat that is operable to remove slack in the belt during rapid vehicle deceleration. The conventional method is to employ pretensioner devices connected to the belt which rapidly withdraw the belt once a pyrotechnic charge fires upon sensed vehicle deceleration. Such pretensioner devices may be mounted beneath the seat. In the case of a school bus seat, the addition of a pretensioner device reduces storage space beneath the seat. In lieu of a pretensioner device, we have devised a device built into the seat to automatically take up slack in the belt as the restrained passenger moves forward with the tower frame assembly during vehicle deceleration.

SUMMARY OF THE INVENTION

One embodiment of the present invention is a three-point lap belt and torso harness passenger restraint system for a school bus having forward-facing bench seats fastened to the vehicle floor and having forward pivoting and deflecting seat backs, comprising a lap belt and torso harness combination connected to a support structure positioned within the bench seat and coupled to the floor of the vehicle. The support structure includes a connecting member connected to the seat support and a tower member pivotally coupled to the seat support. The tower member includes a vertical slot that accepts one end of the connecting member, and both the tower member and the connecting members have coincident apertures through which a portion of the seat support may extend. The tower member lies in the plane of the seat back and is adapted to pivot through a predetermined angle around the rear of the seat support. The relative dimensions of the intersecting slot and connecting member determine the pivot angle.

In another embodiment of the present invention, a three-point lap belt and torso harness passenger restraint system for use with attached school bus seats having forward deflecting seat backs, comprises a three-point harness combination connected to a support structure coupled to the seat support and the vehicle. The support structure includes a connecting member connected to the seat support, a tower member connected to the connecting member and pivotally coupled to seat support, and a crossbar member connected to the front and rear portions of the seat support. The lower end of the tower member is connected to the connecting member, and the tower member is intermediately pivotally mounted to a seat support member. The tower member extends into the seat back and is adapted to pivot through a predetermined angle in response to a force acting thereon. As in the previous embodiment, a belt or harness system attached to the pivoting support structure allows a passenger to pivot forward sufficiently to allow the seat back to deflect according to specification, while holding the passenger in the seat.

In another embodiment of the present invention a restraint apparatus for a passenger in a vehicle having a seat frame mountable to the vehicle. The frame includes a seat portion and a back portion. The back portion has a bottom end portion, and a top end portion with the back portion pivotable forwardly about the bottom end portion toward the seat portion upon crash force applied to the back portion. A retractor has a web extending therefrom through a web guide. The web has a chest portion and a lap portion positionable across a passenger located on the seat portion. The retractor has an unlocked position and a locked position. A first lock is mounted to the web and a second lock is mounted adjacent to the seat portion and lockingly engaged with the first lock. A tower is mounted to the frame and movable with the back portion. A web tensioning arm is mounted to the frame and is moved by the tower to engage the web to take up slack in the web as the arm moves upon crash of the vehicle.

It is an object of the present invention to provide an active restraint system compatible with existing passive restraint school bus seats and the present Federal safety regulations.

A further object of the present invention is to provide an active restraint system for school bus passengers.

Related objects and advantages of the present invention will be apparent from the following description.

BRIEF DESCRIPTION OF THE DRAWINGS

FIG. 3a is an enlarged fragmentary front elevation view of the slot in the tower member of the embodiment of FIG. 1.

FIG. 3b is an enlarged side fragmentary elevation view of the slot in the tower member of FIG. 3a.

FIG. 3c is an enlarged side fragmentary elevation view of the intersection of the tower member and the connecting member, showing the rotation of the tower member.

FIG. 5a is a side elevation view of the embodiment of FIG. 4a.

FIG. 6a is a side elevation view of the connecting member of the embodiment of FIG. 4a.

FIG. 6b is a front elevation view of one vertical piece of the tower member of FIG. 4a.

FIG. 6c is a side elevation view of one vertical piece of the tower member of FIG. 4a.

FIG. 7 an enlarged perspective view of the crossbar member of the second embodiment of FIG. 4a.

DESCRIPTION OF THE ILLUSTRATIVE EMBODIMENTS

Figure 1A:
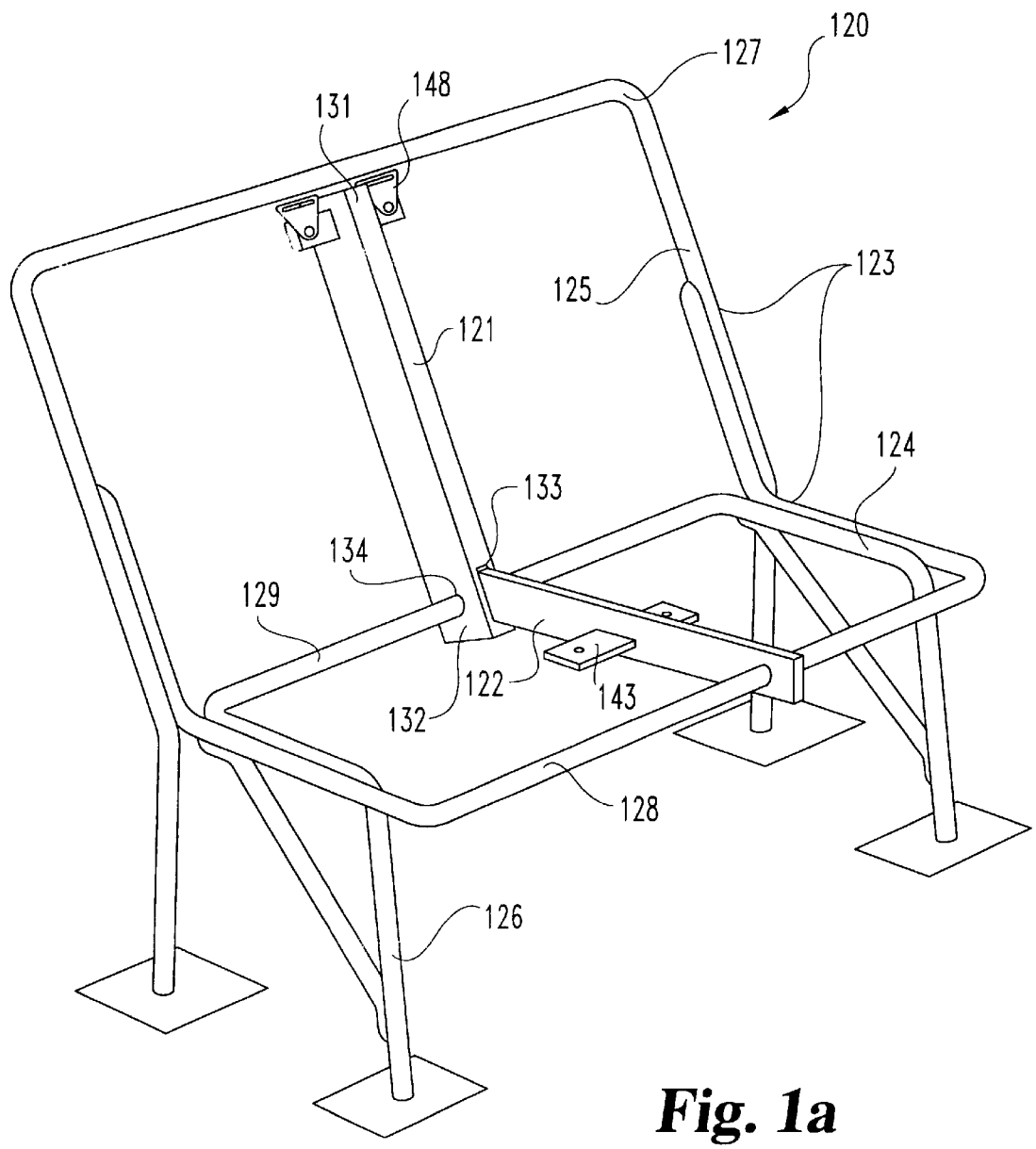
FIG. 1a is a perspective view of a bench seat frame incorporating a first embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
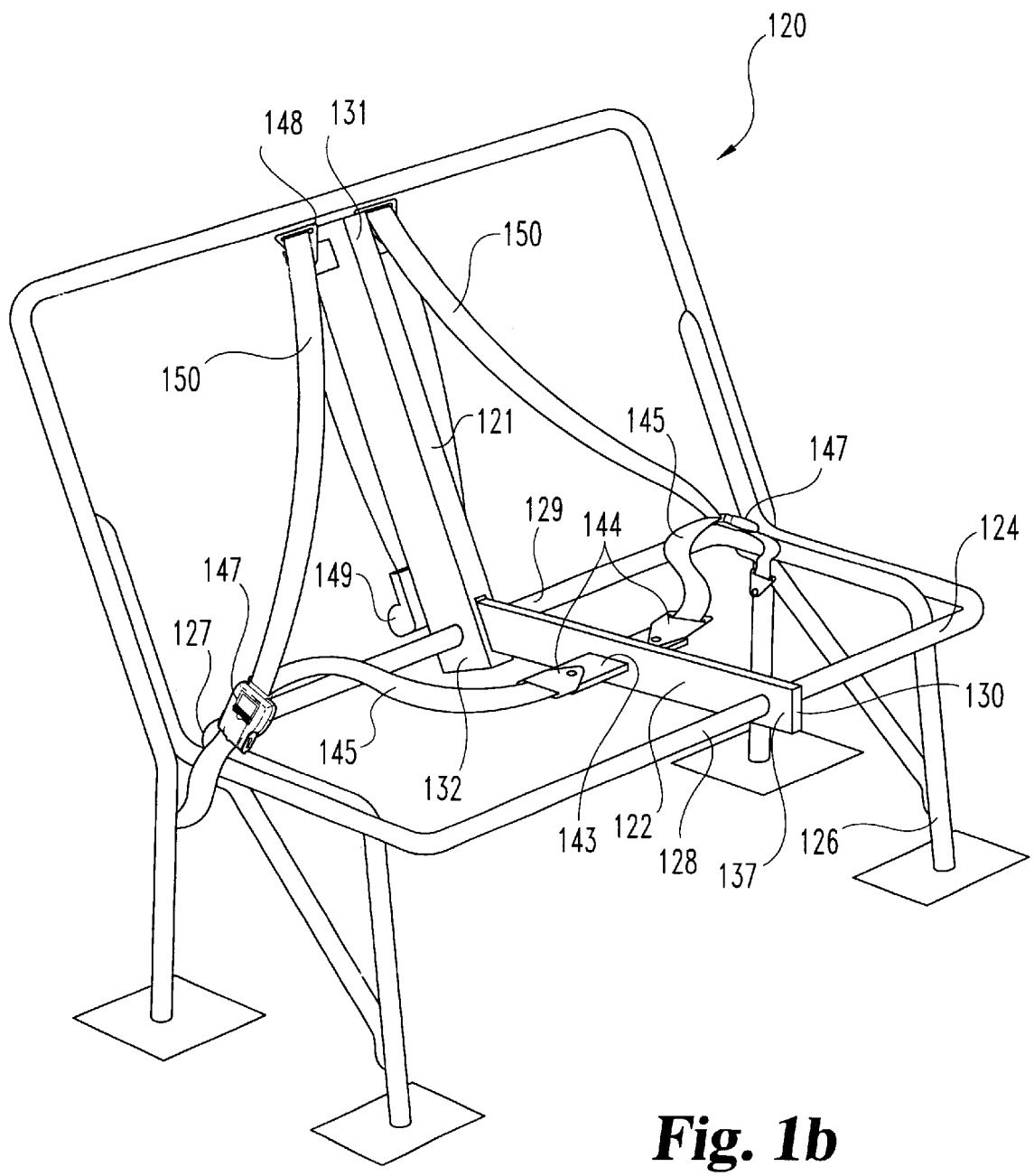
FIG. 1b is the same view as FIG. 1a with the addition of an attached seat belt assembly.
Figure 2B:
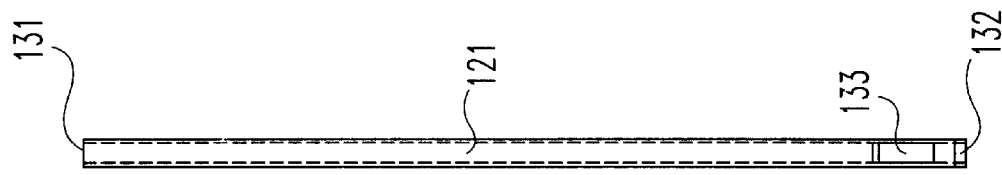
FIG. 2b is a front elevation view of the tower member of the embodiment of FIG. 1.
Figure 2A:
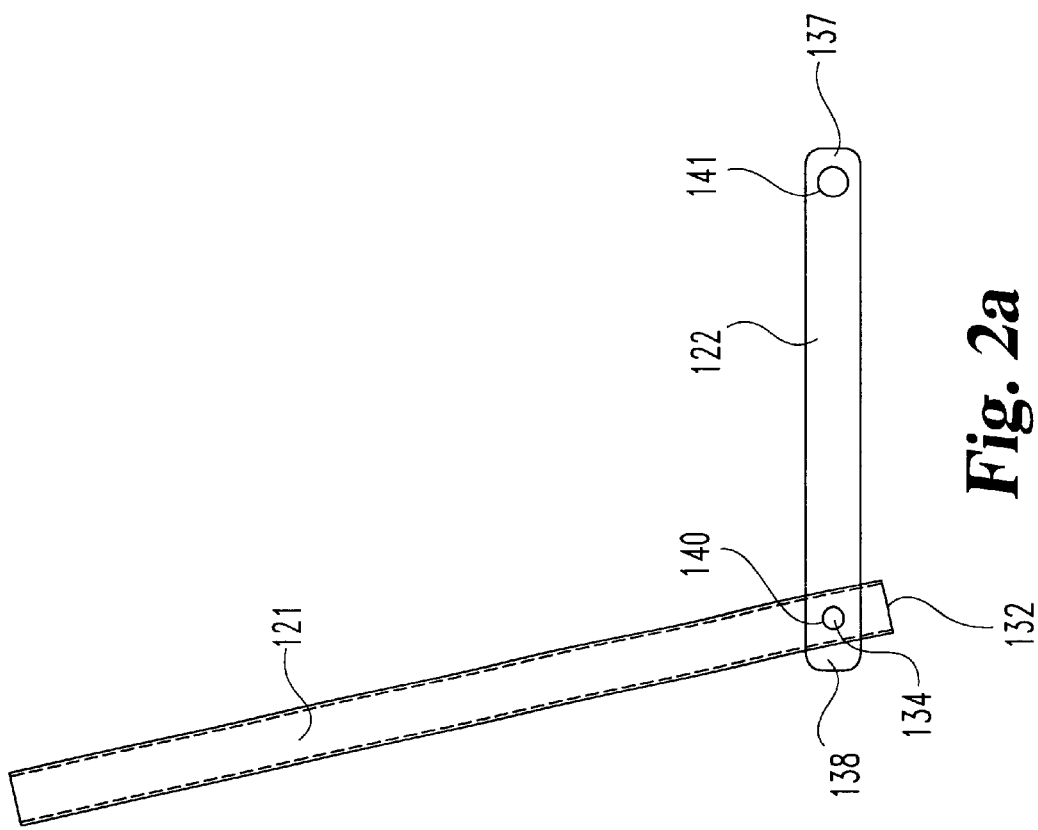
FIG. 2a is a partial side elevation view of the embodiment of FIG. 1.
Figure 2C:
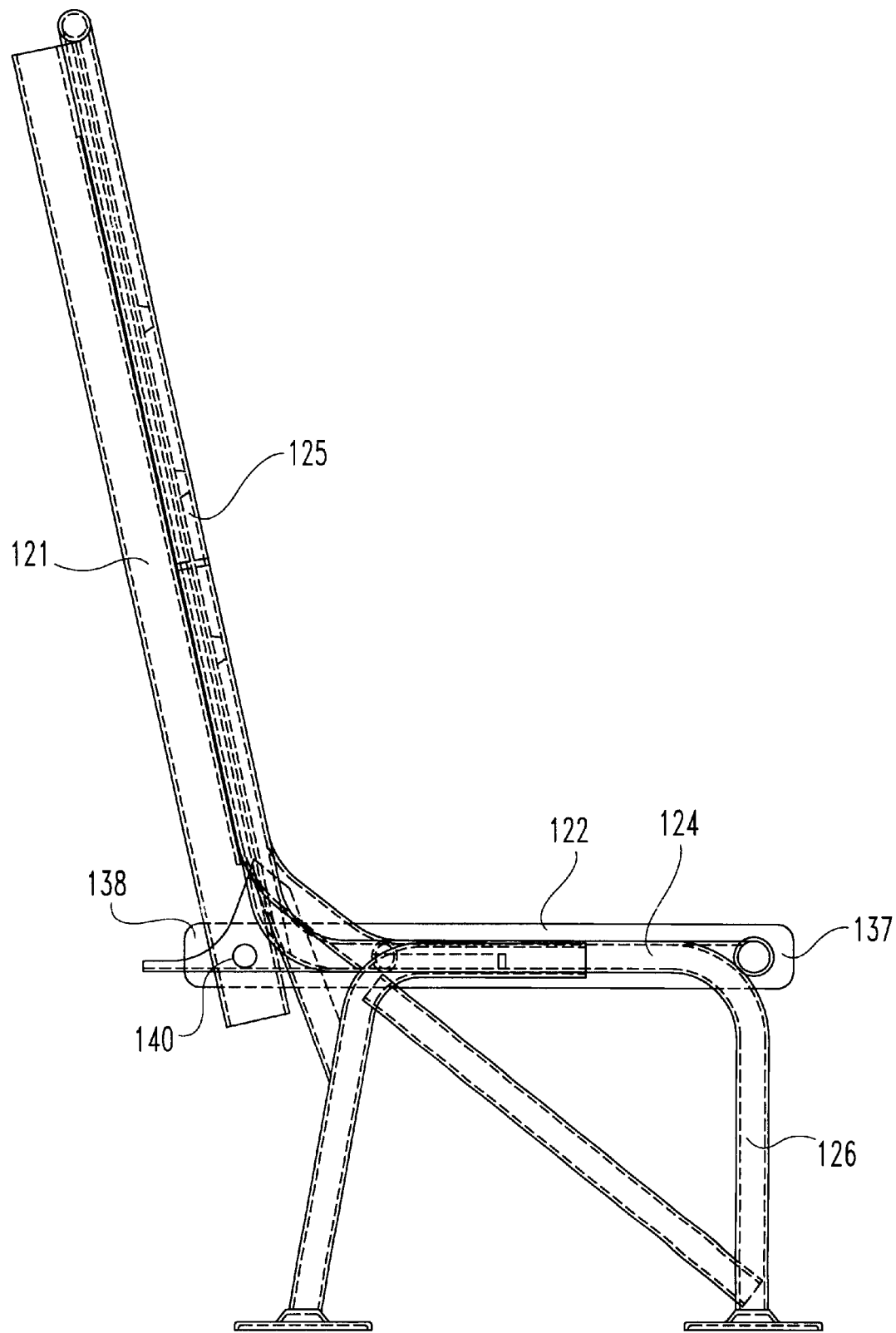
FIG. 2c is a side elevation view of the embodiment of FIG. 1 coupled to a bench seat frame.
Figure 2D:
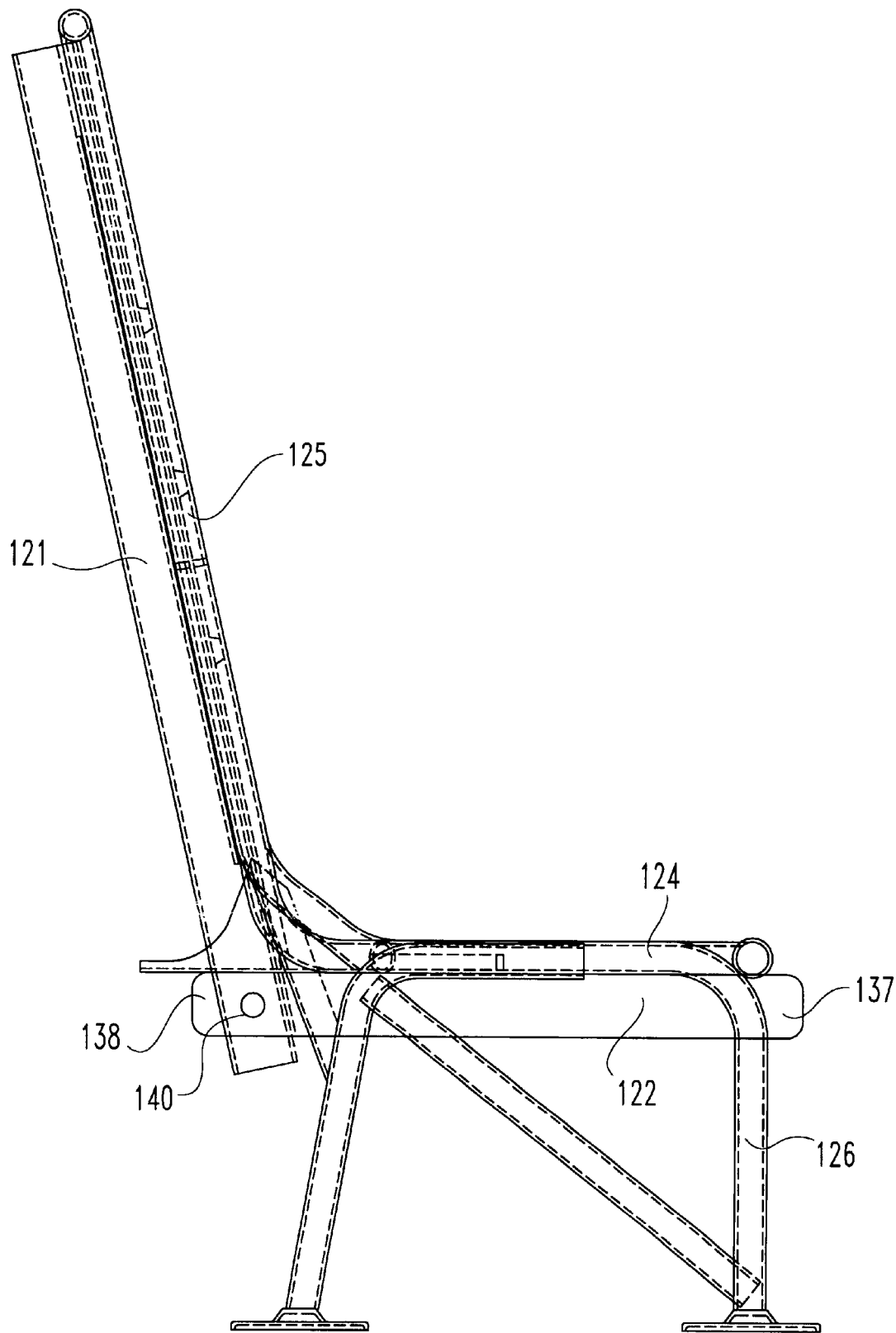
FIG. 2d is a side elevation view of the embodiment of FIG. 1 mounted below a bench seat frame.
Figure 4A:
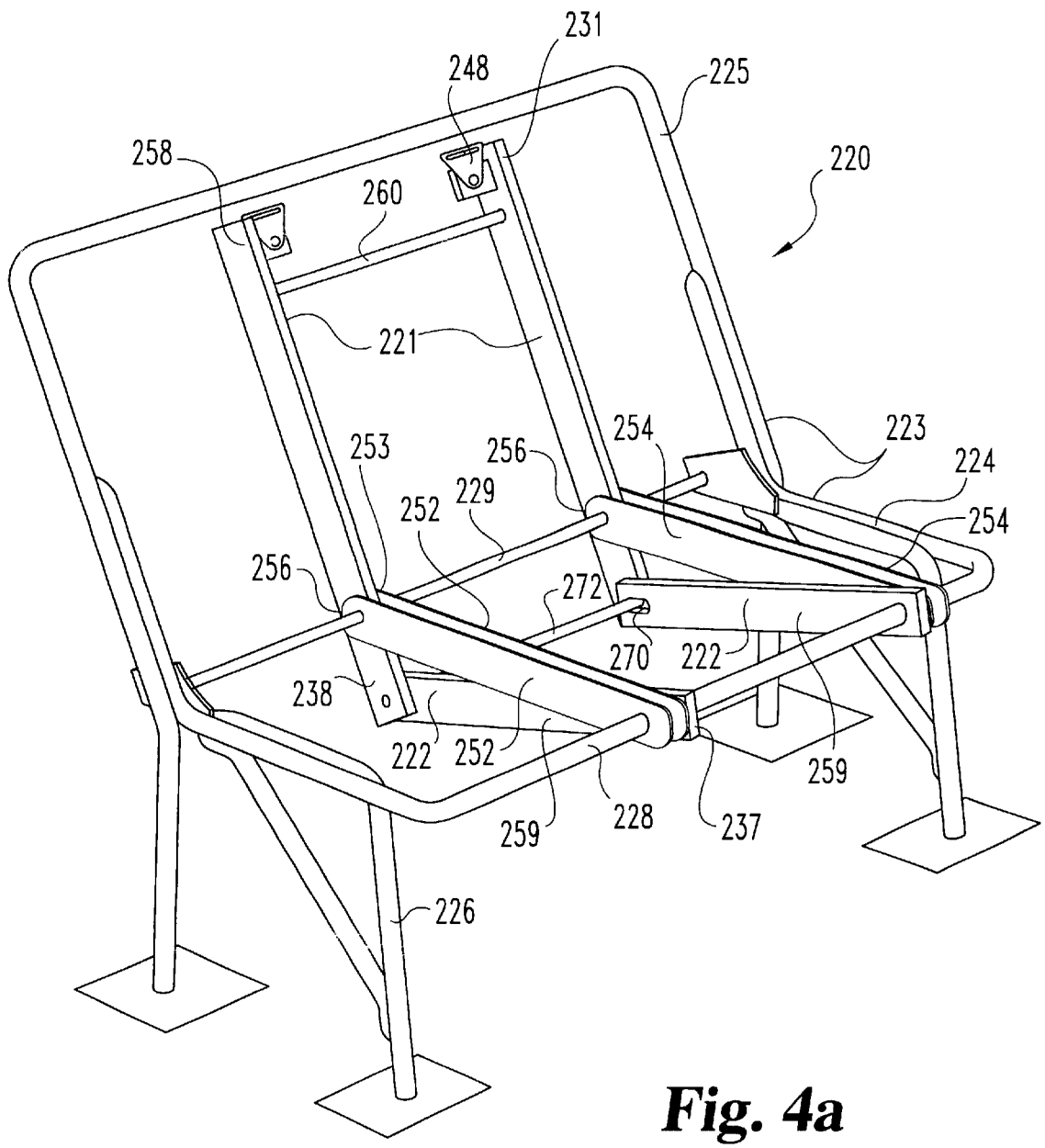
FIG. 4a is a perspective view of a bench seat frame incorporating a second embodiment of the present invention.
Figure 4B:
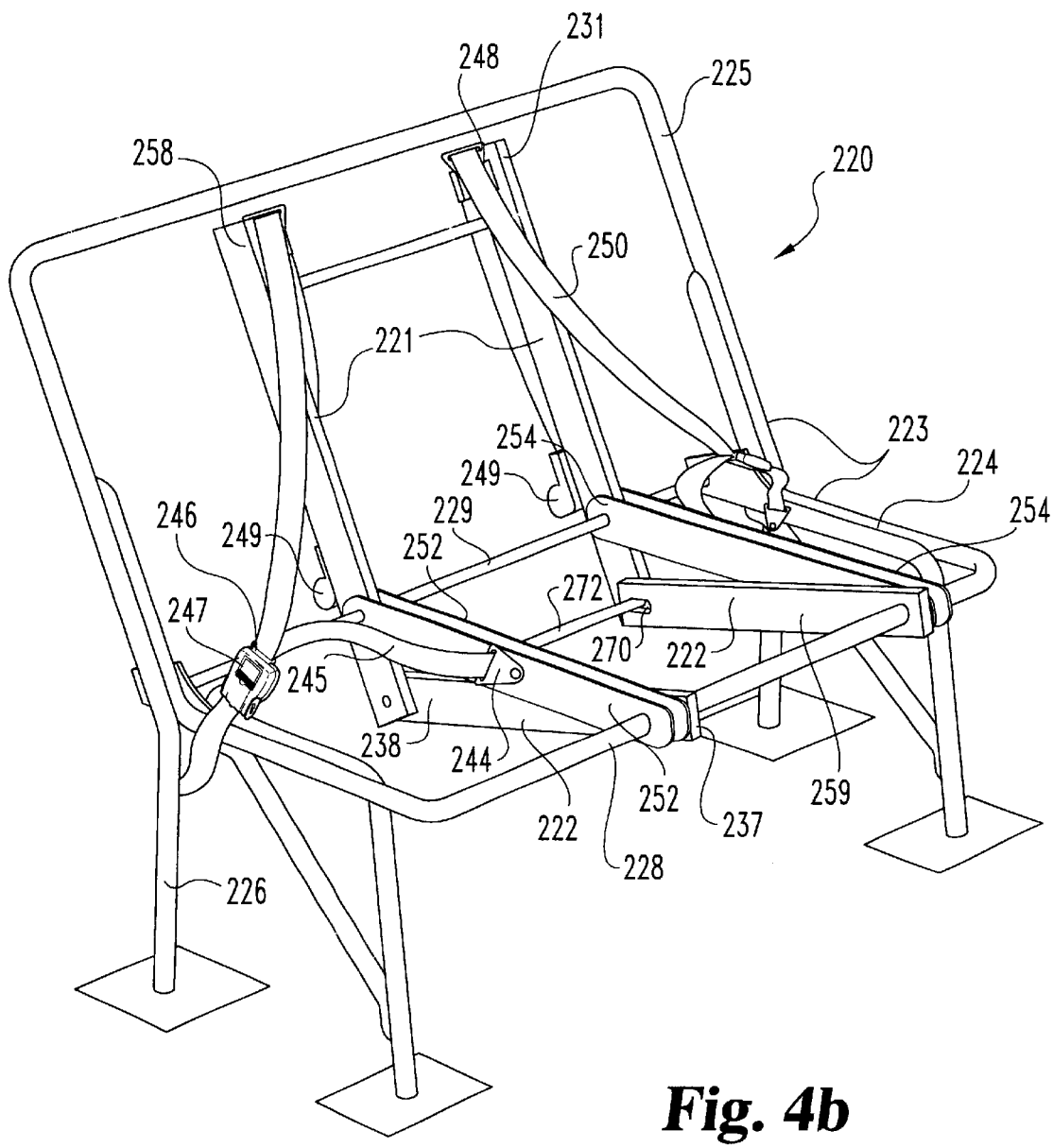
FIG. 4b is the same view as FIG. 4a with the addition of an attached seat belt assembly.
Figure 5C:
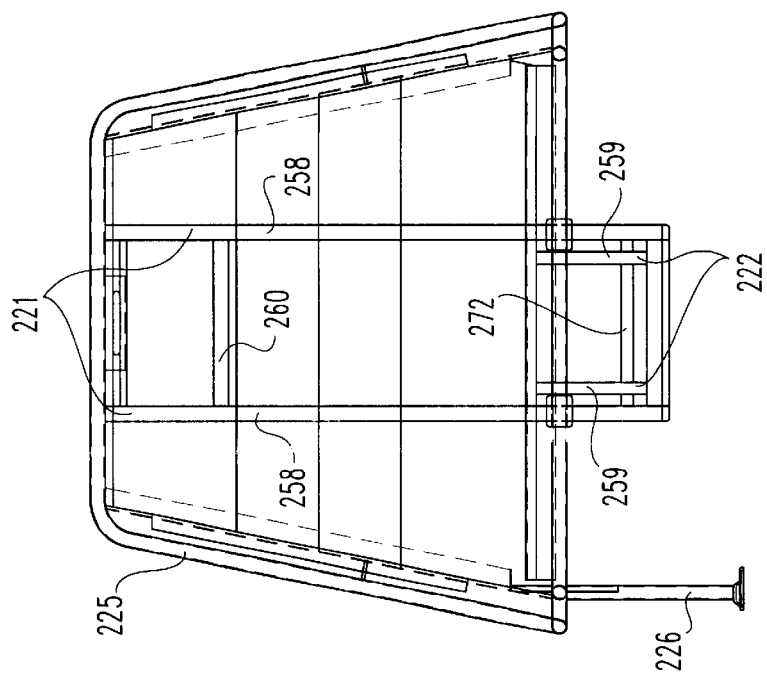
FIG. 5c is a partial front elevation view of the embodiment of FIG. 4b.
Figure 5B:
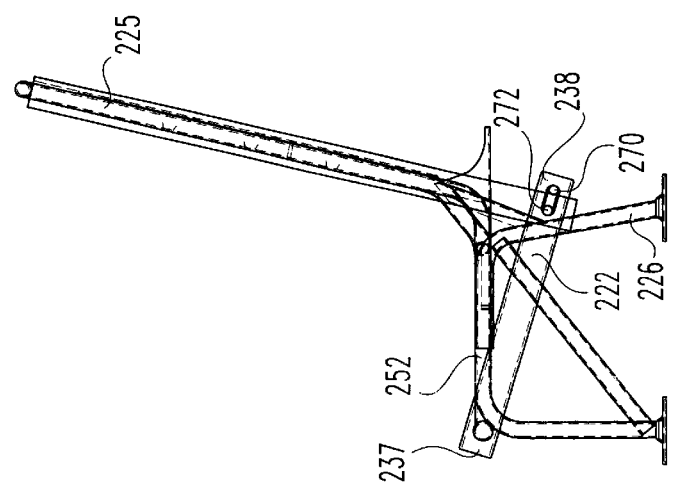
FIG. 5b is a side elevation view of the embodiment of FIG. 4b.
Figure 5A:
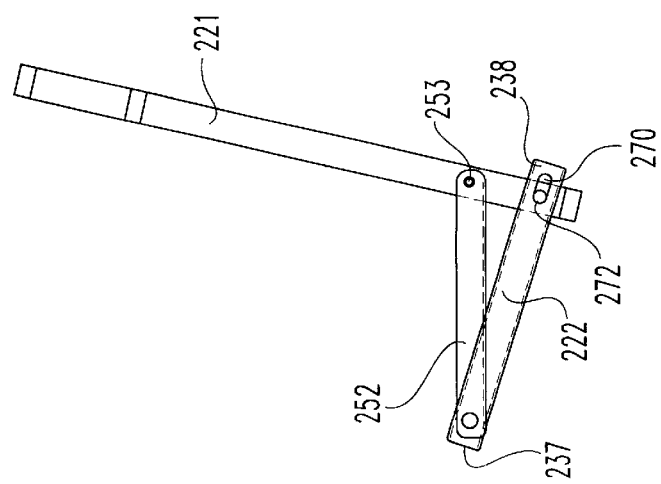
Figure 6A:
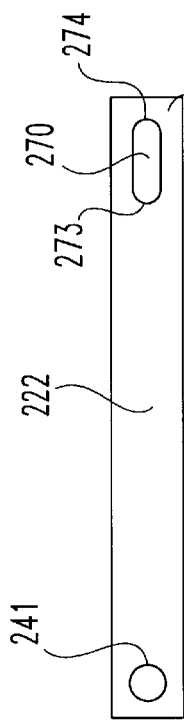
Figure 6B:
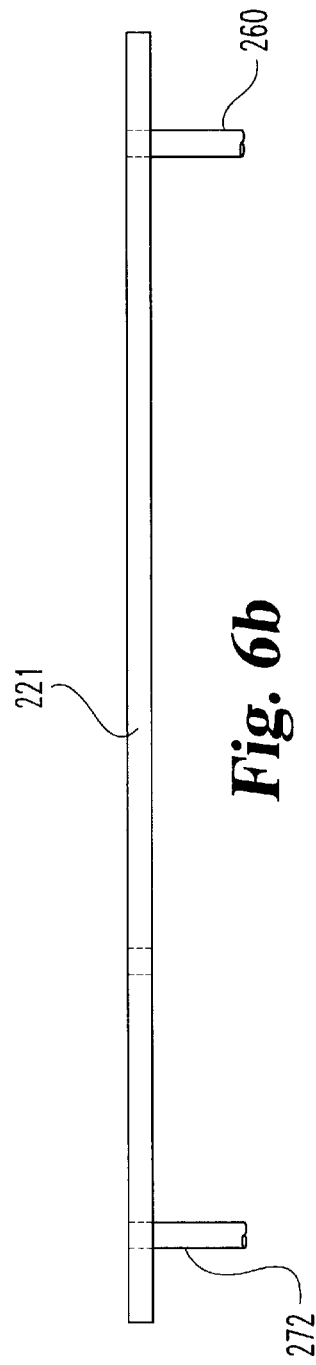
Figure 6C:
Figure 7:
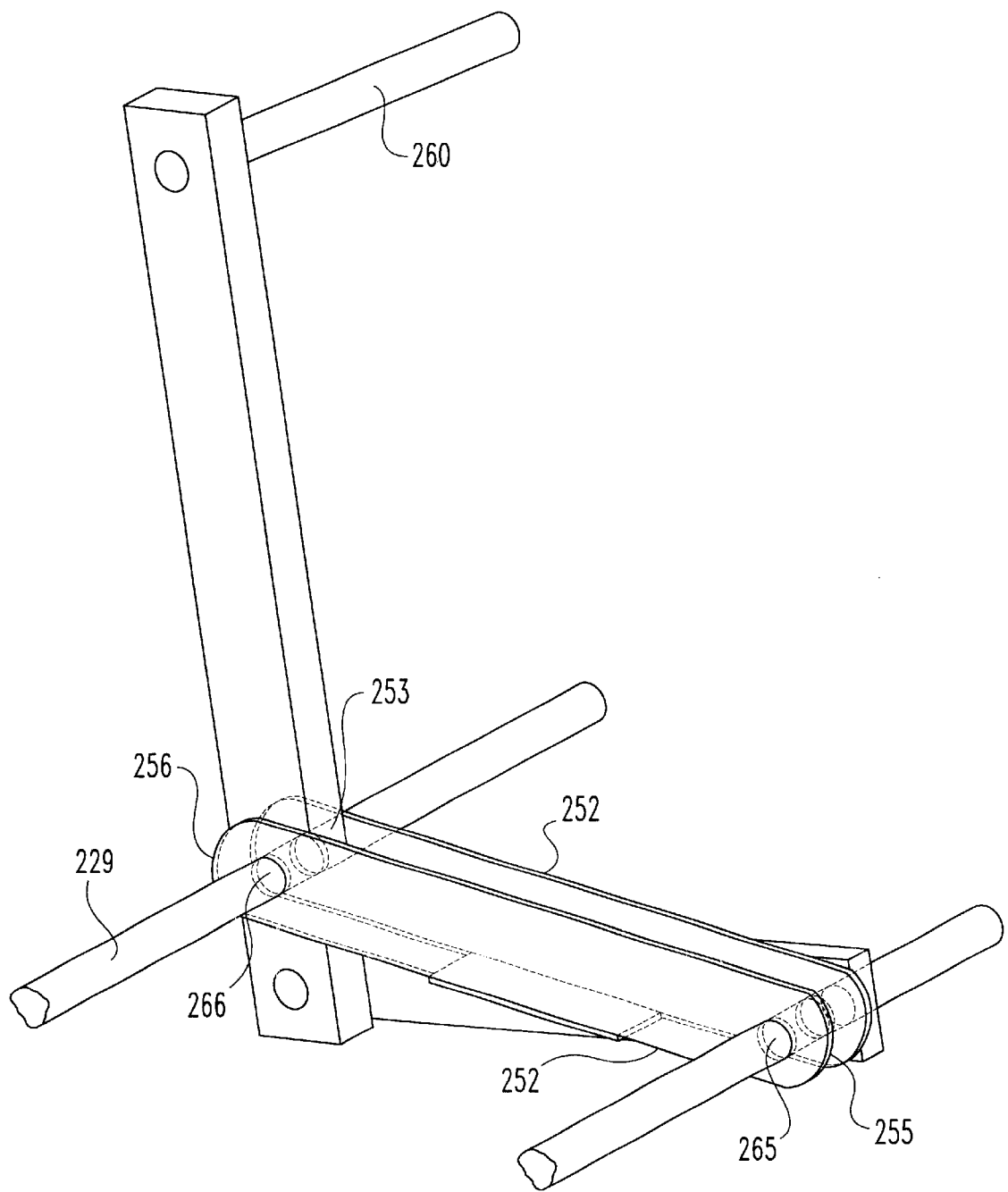
Figure 8:
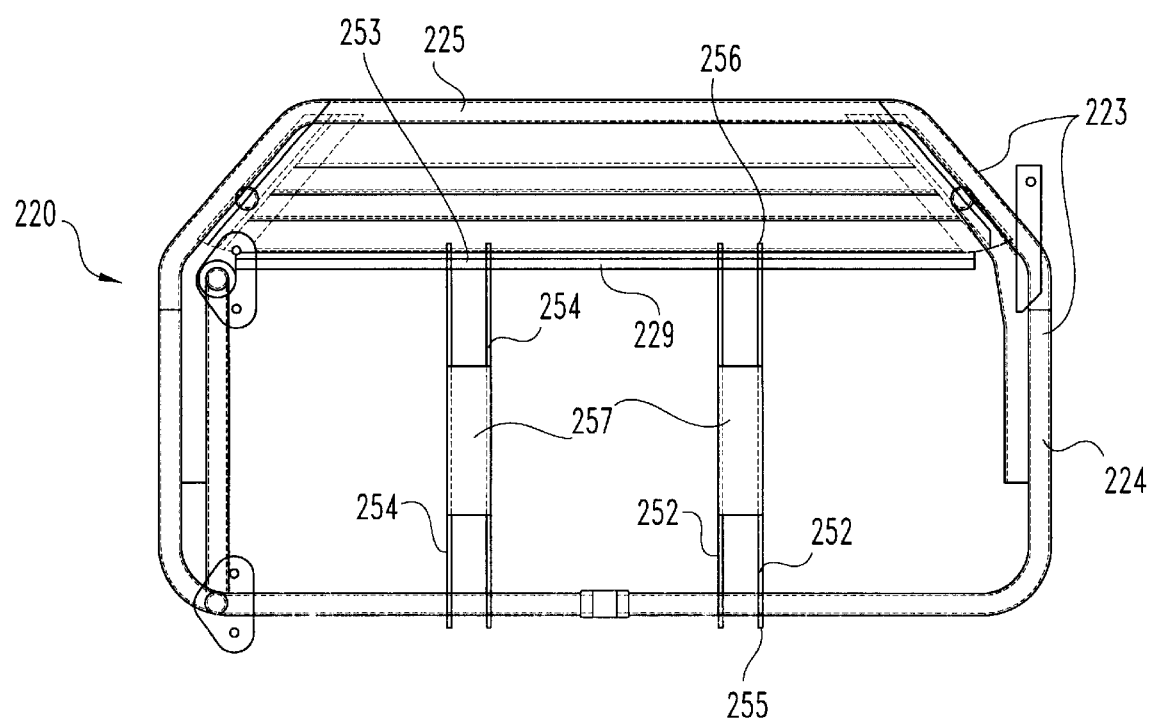
FIG. 8 is a top plan view of the embodiment of FIG. 4b.

Referring now more particularly to the drawings, FIGS. 1 through 3 show a three-point restraint system 120 incorporating a first and illustrative embodiment of the present invention. The restraint system 120 is designed to restrain two passengers sitting side by side. The restraint system 120 includes a tower member 121 movably coupled to a connecting member 122, and is adapted to be mounted to a conventional school bus passenger seat frame 123. Tower member 121 is adapted to move independently relative to seat frame 123. Preferably, tower member 121 is adapted to pivot relative to seat frame 123. The members comprising restraint system 120 are formed from steel or any convenient structural material. Seat frame 123 includes a seat support portion 124 connected to a seat back portion 125 and also connected to a leg portion 126 adapted to be affixed to a surface, such as the floor of a school bus. Seat support portion 124 is typically formed from one or more bent metal tubes 127 and includes a front portion 128 and a rear portion 129. Seat support portion 124 may be wrapped or embedded in a cushion upon which a passenger may sit. Seat back 125 portion, also formed from bent metal tubes 127, may likewise be cushioned.

Connecting member 122 is formed having a rectangular cross-sectional shape 130, although in other embodiments connecting member 122 may have any convenient cross-sectional shape. Tower member 121 has a top end 131 and a bottom end 132. Bottom end 132 includes a slot 133 shaped to accept connecting member 122 and a pair of parallel apertures 134 perpendicular to slot 133 through which rear portion 129 of seat support portion 124 may pass to couple tower member 121 to seat frame 123. Tower member 121 lies in the plane defined by seat back portion 125 with the top end of tower member 121 extending substantially into seat back portion 125.

Connecting member 122 has a front end 137 and a rear end 138, and includes a rear aperture 140 through which rear portion 129 may extend to mount connecting member 122 to seat 123. Connecting member 122 is inserted into slot 133 in tower member 121. In operation, tower member apertures 134 may be aligned coincident with connecting member rear aperture 140 enabling rear metal tube 129 to be passed therethrough, coupling tower member 121 and connecting member 122 to seat support portion 123 and to each other. Connecting member 122 further includes front aperture 141 through which front portion 128 extends, mounting connecting member 122 to seat 123. (See FIG. 2c) Alternatively, connecting member 122 may be affixed to seat support portion 124 by any convenient fastening means. (See FIG. 2d)

In operation, connecting member 122 lies in the plane defined by seat support portion 124. Both tower member 121 and connecting member 122 may be embedded in cushions that simultaneously provide passenger comfort and prevent restraint system 120 from moving or jiggling. In the illustrative embodiment, tower member 121 is pivotally coupled to seat support portion 124. A stop means operable to limit the movement of tower member 121 is provided by the presence of connecting member 122 in slot 133, which limits the pivot angle 139 (see FIG. 3c) through which tower member 121 may be rotated. While the illustrative stop means is connecting member 122 filling slot 133, any convenient stop means may be used. It is preferable that the pivot angle 139 through which tower member 121 may pivot is acute. It is more preferable that the pivot angle 139 be about 17 degrees, corresponding to the maximum allowed deflection of seat back portion 125 caused by two unbelted passengers striking seat back 125 from behind and two belted passengers pulling on tower member 121 from the front. Slot 133 preferably extends through tower member 121 at a slight angle to the normal, such that when connecting member 122 engages tower member 121 connecting member 122 may rest in the horizontal plane of seat support portion 124 while tower member 121 remains tilted backwards a few degrees to the vertical. (See FIG. 3c) In this embodiment, the dimensions of connecting member 122 and slot 133 are sized relative to each other such that tower member 121 may rotate forward through a maximum of 17 degrees. (See FIG. 3c)

Restraint system 120 also includes anchor wing 143 connected to connecting member 122. A seat belt anchor 144 is fixedly attached to anchor wing 143, becoming one point of a three-point restraint. (See FIG. 1b) Seat belt anchor 144 connects lap belt 145 terminating in a tongue 146 to seat frame 123. Alternatively, two seat belt retractors could be attached to both anchor wings 143, retractably connecting lap belts 145 thereto. Restraint system 120 further includes a buckle 147 fixedly attached to seat support portion 124 and adapted to lockingly engage tongue 146. Restraint system 120 further includes a pair of guides 148, such as, a conventional D-loop, attached near the top of tower member 121. A pair of torso belt retractors 149 are connected to tower member 121, each housing a torso belt 150 and becoming the second point of the three-point restraint. The torso belt 150 is extended upwardly through guide 148 and downwardly across the torso of a seated passenger. The extending end of torso belt 150 also connects to tongue 146. When tongue 146 is locked in buckle 147, buckle 147 becomes the third point of the three-point restraint. Alternatively, a single belt (not shown) may extend between retractor 149 and anchor 144 with a tongue (not shown) slideably mounted intermediate thereto.

In operation, the invention adds active passenger restraint protection to the passive restraint already provided by the deflecting school bus seats. Tower member 121 does not interfere with the passive restraint function of the seat back 125, since tower member 121 is adapted to pivot forward along with the seat back 125 in response to a rear impact. Seat back portion 125 deflects forward in response to a forward force applied thereto consisting of a passenger located rearward of the seat back portion 125 impacting seat back portion 125 and/or a forward force applied to support tower 121 via torso belt 150 by a seated passenger pulling against the torso belt 150.

Another embodiment of the present invention is shown in FIGS. 4 through 8. In this embodiment, the restraint system 220 includes a tower member 221, a connecting member 222, and a crossbar member 252 and is adapted to be mounted to a seat frame 223. Seat frame 223 includes a seat support portion 224 connected to a seat back portion 225. Seat frame 223 is also connected to a seat leg portion 226 adapted to be affixed to a surface, such as a school bus floor. Seat support portion 224 is made of bent metal tubing and includes a front portion 228. Rod member 229 extends transversely across seat back portion 225 substantially within the plane defined by seat support portion 224. Seat frame 223 may be wrapped or embedded in cushioning material to provide passenger comfort.

Harness support assembly is made up of tower member 221, connecting member 222, and crossbar member 252, and is mountable to seat frame 223. When so mounted, tower member 221 lies substantially in the plane defined by seat back portion 225, and extends through the plane defined by the seat support portion 224. Rear end 238 of connecting member 222 connects to tower member 221 below the plane defined by seat support portion 224. Front end 237 of connecting member 222 connects to front portion 228 of seat support portion 224. In this embodiment, front end 237 of connecting member 222 features front aperture 241 (FIG. 6a) through which front portion 228 of seat support portion 224 extends. Tower member 221 is pivotally mounted to seat support portion 224 at pivot point 253. In order to accommodate two passengers, a pair of harness assemblies is provided, each with a tower member 221, connecting member 222 and crossbar members 252 and 254.

Rod member 229 extends through tower member 221 and crossbar members 252 and 254. In the illustrative embodiment, crossbar member 252 includes two parallel plates lying substantially within the plane of the seat support portion 224 and extending from the front portion 228 to the rod member 229. Proximal end 255 (FIG. 7) of crossbar member 252 includes substantially circular apertures 265 through which front portion 228 of seat frame 223 extends. Distal end 256 of crossbar member 252 includes circular apertures 266 through which rod member 229 extends at pivot point 253. In this embodiment a crossbar coupling member 257 (FIG. 8) connects the plates of member 252. Likewise, a second connecting member 254 is provided consisting of two plates being connected to the second tower member in the same manner as described for member 252.

Tower member 221 comprises a pair of substantially vertically disposed members 258 (FIG. 5c), connected by tower coupling member 260. In other embodiments, tower member 221 may comprise a different number of vertical members. Likewise, in this embodiment connecting member 222 comprises two interconnected portions 259 (see FIG. 5c).

Each connecting member 222 includes a slot 270 (see FIG. 4a) at rear end 238. A pin 272 extends through slots 270 with the opposite pin ends fixed to vertical members 258. The pin slideably connects members 222 to the tower 221. In normal operation, tower member 221 rests within the plane of the seat back 225, tilted slightly rearwards with the pin 272 positioned at the forward end 273 (see FIG. 6a) of the slot 270. As tower member pivots about pivot point 253, pin 272 moves towards the rear of slot 270. Pivoting of tower member 221 is halted when pin 272 reaches rear end 274 of slot 270. The length of slot 270 determines the maximum angle through which tower member 221 may pivot. In this embodiment, the length of the slot 270 is such that the maximum angle through which the tower member 221 may pivot is 17 degrees.

As in the previous embodiment, restraint system 220 also includes guides 248 connected near the top end 231 of tower member 221. Seat belt retractors 249 (FIG. 5b) are fixedly attached to the two vertical members of tower 221. Each seat belt retractor 249 house a torso belt 250, which connect to a tongue 246 in turn connected to lap belt 245. Restraint system 220 also includes a buckle 247 fixedly attached to seat support portion 224 and adapted to lockingly engage tongue 246. Torso belt 250 is extended upwardly from torso belt retractor 249 through guide 248 and downwardly across the torso of a seated passenger while lap belt 245 extends horizontally across the passenger's lap. Alternately, a single belt (not shown) may extend between retractor 249 to anchor 244 with a belt tongue slideably mounted intermediate thereto.

Many variations are contemplated and included in the present invention. In addition to those described in relation to the above embodiments, the present system contemplates including means for preventing premature forward deployment of the tower member 221 relative to the seat back. For example, the top end of tower 221 may be connected to seat back portion 225 limiting relative motion therebetween until sufficient force breaks the top end of the tower apart from the seat back portion.

The preferred embodiment of the restraint system is shown in FIGS. 9–15. School bus seat 300 includes a main frame 304 with a pair if front legs 301 and 302 and a pair of rear legs 303. The legs extend upwardly being joined to main frame 304 having a front member 305 integrally joined to a pair if rearwardly extending horizontal members 306, 307, and 309. A tubular member 308 has opposite ends integrally joined to side members 306 and 307 with center member 309 extending between and integrally joined to front member 305 and cylindrical member 308. A pair of flanges 310 and 311 are integrally joined tot he cylindrical member 38 and the opposite sides of member 309.

Frame 304 forms the frame for the seat portion of the seat whereas a second frame 312 forms the frame for the back portion of the seat. Frame 312 includes a horizontally extending tubular portion 313 integrally joined to a pair of downwardly extending tubular portions 314 and 315 forming a single frame, in turn, having bottom ends integrally joined to frame 304. Frames 304 and 312 are located within the cushion respectively of the seat portion and back portion of the seat. tubular portions 314 and 315 are rigid; however, will bend forward as forward impact pressure is applied to the back portion of the seat forcing the back portion of the seat about its bottom end toward the seat portion of the seat.

Upwardly extending towers 316 and 317 are located immediately inward of frame portions 314 and 315. Tower 316 is mounted to and between plates 355 and 356 (FIG. 10) which have holes 380 (FIG. 9) through which tube 308 freely extends allowing the tower to pivot on tube 308 in the direction of arrow 322 to and from the seat portion of frame 304. Tower 317 is mounted in a similar manner. The top ends of towers 316 and 317 are joined together by horizontally extending member 323. Flanges 324 and 325 are integrally attached to the top ends of towers 316 and 317 and provide guides through which the webs extend. Wall 339 is fixedly mounted to frame 312 and member 323 preventing member 323 from moving behind frame 312. Wall 339 breaks when forward force is applied to either frame 312 or towers 316/317 allowing independent movement of towers 316/317 relative to frame 312.

Box constructions 381 and 382 extend between and are fixedly attached to rear member 308 and front member 305. Each box construction supports a plurality of stationary bearings and a web retractor. Box construction 381 and 382 include respectively inner plates 328 and 329 having rear ends integrally secured to member 308 and front ends fixedly secured to member 305. Likewise, box constructions 381 and 382 have outwardly located members, respectively 330 and 331 integrally secured and extending between members 308 and 305. Retractor plates 326 and 327 are secured respectively to members 328 and 330 and members 329 and 331. Two conventional inertia locking retractors are respectively mounted to and beneath plates 326 and 327 with the web of each retractor extending rearwardly toward tubular member 308.

Each box construction 381 and 382 have three stationary bearings with their opposite ends fixedly attached to the inner member and outer member of each box construction. For example, bearings 332, 333 and 334 (FIG. 10) have first ends fixedly attached to inner member 328 and second ends fixedly attached to outer member 330. Retractor 335 (FIG. 11) is fixedly attached to and beneath plate 326 and has web 336 extending rearwardly over stationary bearings 332–334 but beneath movable bearings 337 and 338. Web 336 continues around tubular member 308 extending upwardly behind tower 316 to the top of the tower. The web then extends over a bearing surface at the top of the tower and freely through a loop, such as flange 324 (FIG. 9) with the distal end 340 of web 336 being fixedly attached to the rear corner 341 of frame 304.

A conventional seat belt buckle tongue 342 is slidably mounted to web 336 and is locking engagable with a conventional seat belt buckle 343, in turn, attached by web 344 to flange 310. Thus, with web 344 extending upward through the seat cushion, tongue 342 may lockingly engage buckle 343 forcing the web across the shoulder and chest of the occupant residing on the seat and then across the lap of the occupant. Web 336 therefore includes a chest portion 395 and a lap portion 345 when the tongue is secured to the buckle. Web 336 extends outward of the cushion forming the back portion of the seat. An identical retractor web combination is provided on the right side of the seat as viewed in FIG. 9 relative to tower 317 and box construction 382.

When force is applied in a forward direction to the rear of the seat by a passenger located behind seat 300, frame portions 314 and 315 are pushed forward bending and pivoting about their bottom ends. Frame portions 314 and 315 are sufficiently rigid to hold the seat back portion in an upright position but sufficiently weak to bend when rearward force is applied thereto thereby being in compliance with the safety standards set by the National Highway Traffic Safety Administration as discussed in the Description of the Prior Art herein. If a seat 300 is occupied then the forward motion of the passenger on seat 300 will apply forward force via web 336 to tower 316 rupturing breakable wall 339 allowing the tower to pivot independent of frame 312. Towers 316 and 317 are pivotally mounted to tube 308 thereby allowing the towers to pivot forward towards the seat portion or frame 304 of the seat. A pair of stop flanges 350 and 351 are fixedly attached respectively to towers 316 and 317 and project forwardly of the towers. The stop Flanges are designed to allow only a limited amount of forward pivotal motion of the towers. Once the stop flanges contact members 330 and 331, additional forward pivotal motion of the towers and frame 312 is prevented.

Stop flange 350 will now be described it being understood that a similar description applies to stop flange 351. Stop flange 350 includes a pair of spaced apart walls 355 and 356 (FIG. 10) fixedly secured to the opposite sides of the bottom of tower 316. A wall 357 has opposite ends fixedly attached to walls 355 and 356 and extends therebetween. Wall 357 is elevated and spaced apart from the top surface of member 330 when the tower is in the erect or normal position. Wall 357 is spaced apart from the top surface of member 330 to only allow a predetermined amount of forward pivotal motion of the tower unit the wall contacts the top surface of member 330 thereby preventing further pivotal motion of the tower and frame 312. The amount of forward pivotal motion of the tower is designed to be in accordance with the deflection requirements of the National Highway Traffic Safety Administration specifications as previously discussed.

Figure 11:
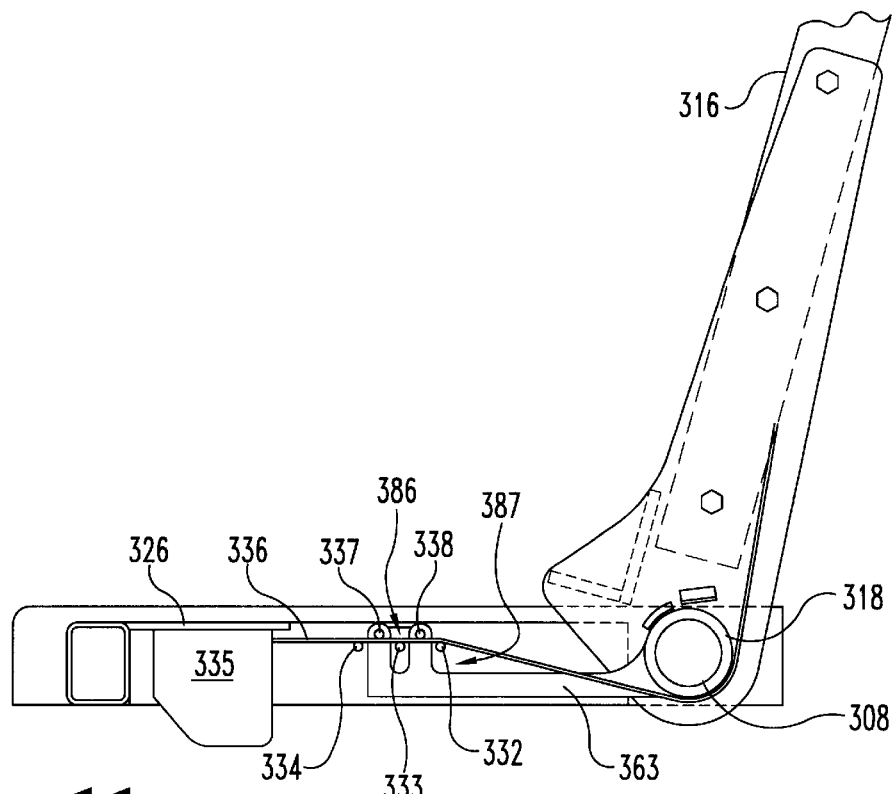
FIG. 11 is a fragmentary cross sectional view of the seat portion and back portion of the frame in a pre-crash condition taken generally along the line 11—11 of FIG. 9 and viewed in the direction of the arrows.

A web slack take-up device is mounted within each box construction 381 and 382. The web slack take-up device 360 (FIG. 13) positioned within box construction 381 will now be described it being understood that a similar description applies to the web slack take-up device positioned within box construction 382. device 360 includes a bottom wall 361 secured to a pair of upwardly extending side walls 362 and 363 between which are fixedly mounted a pair of bearings 337 and 338. Web 336 extends between bearings 337 and 338 and the three stationary bearings 332–334 (FIG. 11). The proximal ends of walls 362 and 363 are fixedly attached to sleeve 318 and are designed to pivot around tube 308. Tube 308 extends freely through sleeve 318 (FIG. 9) and sleeve 319 of the slack take up device mounted within box construction 382. Walls 362 and 363 have cut out portions 386 and 387 (FIG. 11) preventing interference of walls 362 and 363 with stationary bearings 333 and 332 when the tower is in the erect position.

Towers 316 and 317 cause the slack take-up device to pivot downwardly as the towers pivot toward the seat portion of the seat; however, pivotal movement of the towers in an opposite direction away from the seat portion does not cause the slack take-up devices to pivot to their original positions. Each tower includes a projection contactable with a projection extending outwardly from sleeves 318 and 319. For example, tower 316 includes projection 370 (FIG. 14) extending inwardly whereas sleeve 318 includes projection 371 extending outwardly toward tower 316. Thus, when tower 316 pivots in a counter clockwise direction, as viewed in FIG. 14, projection 370 contacts projection 371 causing sleeve 318 and bearings 337 and 338 to pivot therewith in a counter clockwise direction removing slack from the web. Movement of tower 316 in a clockwise direction simply moves projection 370 apart from projection 371 without moving sleeve 318.

Figure 12:
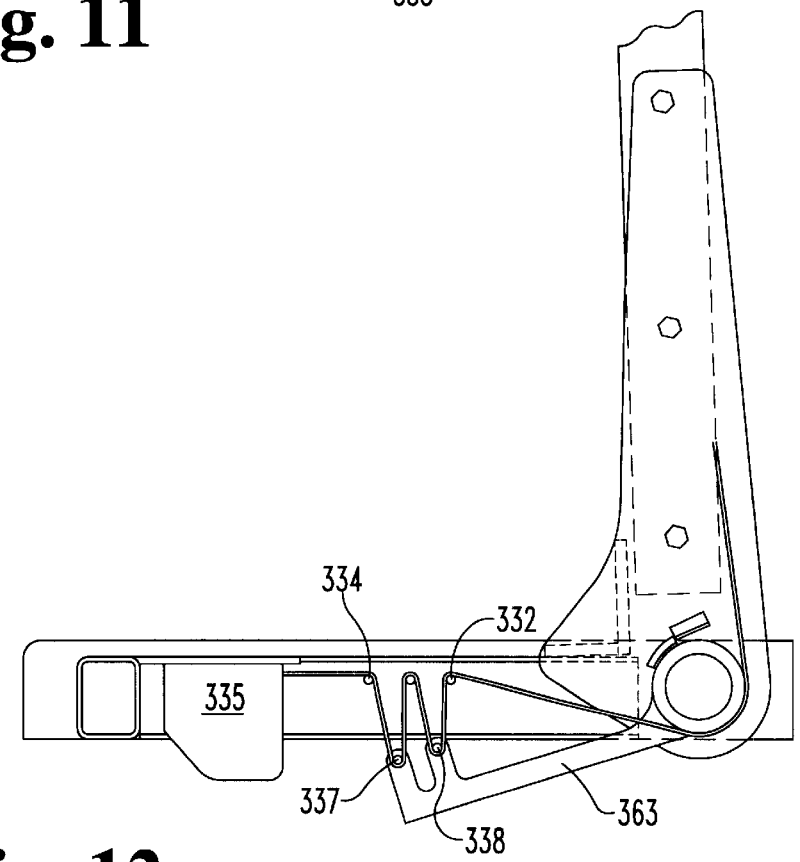
FIG. 12 is the same view as FIG. 11 only showing the back portion tilted forward in a crash condition with belt slack taken up.
Figure 13:
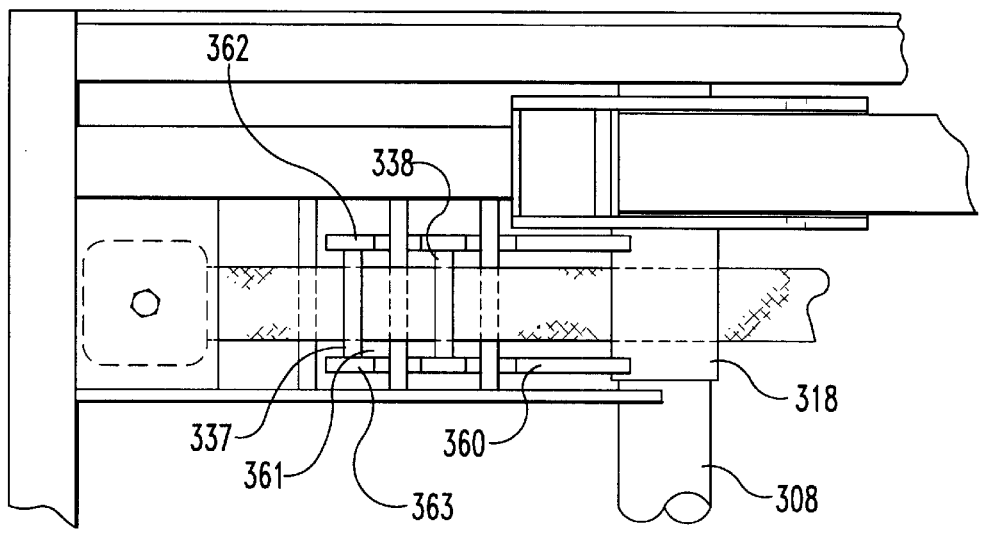
FIG. 13 is a fragmentary top view of the bench seat of FIG. 10.
Figure 14:
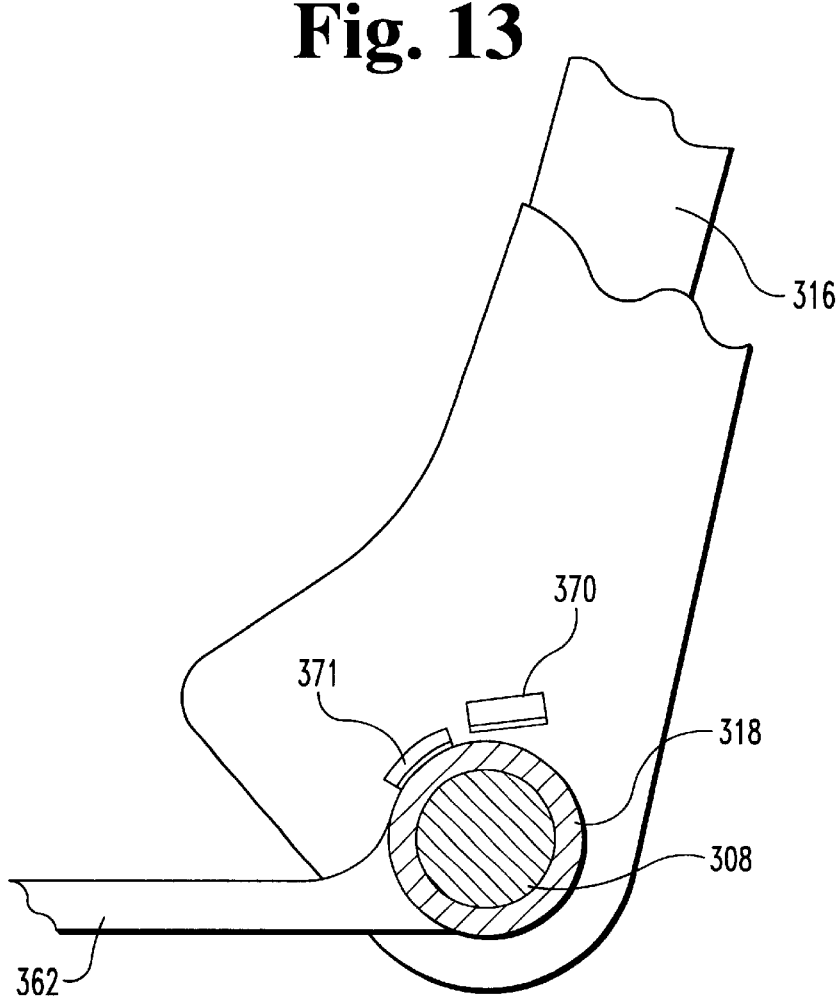
FIG. 14 is a cross sectional view taken generally along the line 14—14 of FIG. and viewed in the direction of the arrows.

In operation, upon the occurrence of a crash, forward force may or may not be applied to the rear of the seat by the passenger located behind the seat. Forward force is applied however to web 336 by the occupant resting upon seat 300. With retractor 335 locked as the result of sensed deacceleration, forward force is applied via the web to towers 316 and 317 causing the towers to pivot forwardly toward the seat portion of the seat. Stops 350 and 351 of towers 316 and 317 limit the forward pivotal motion of the towers. Simultaneously, the web slack take-up devices within each box construction 381 and 382 pivot downward resulting in bearings 337 and 338 of each web slack take-up device contacting the respective web of each retractor forcing the webs into a serpentine path as depicted in FIG. 12 thereby removing any slack from the webs. Even if an occupant is not resting upon seat 300, impact of a passenger behind seat 300 upon the back portion of seat 300 will cause frame 312 to bend and pivot toward the seat portion of the seat to the maximum angle permitted by stops 350 and 351.

Figure 15:
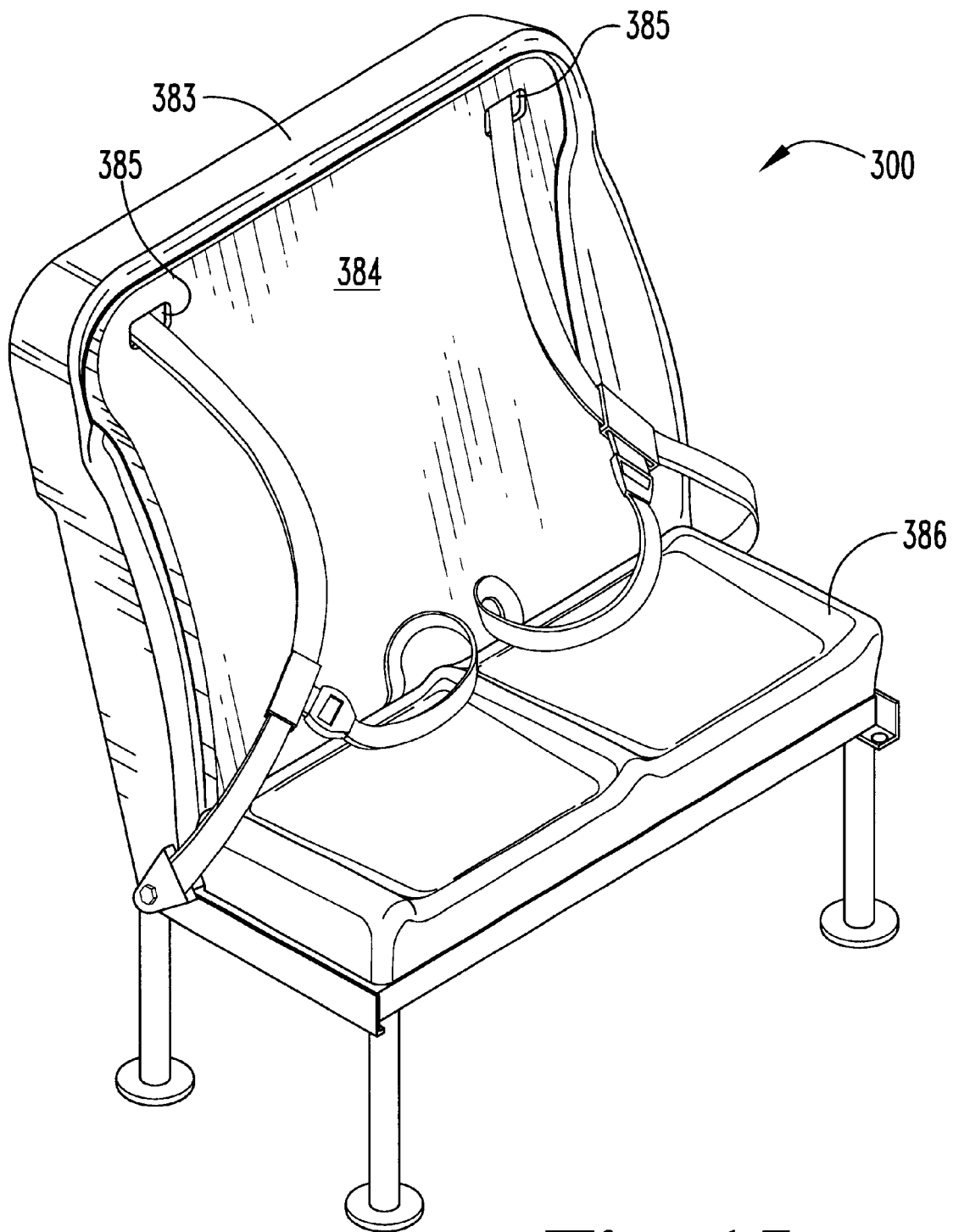
FIG. 15 is a perspective view of an illustrative embodiment of the seat including the seat cushion.

FIG. 15 illustrates seat 300 which has a seat cushion or other enclosure 386 enclosing frame 304, a cushion or other enclosure 383 enclosing frame 312 and a center cushion or other enclosure 384 enclosing towers 316 and 317 along with member 323. Slots 385 are provided in cushion 384 for the webs to extend through. Cushion 383 is indented to receive cushion 384 to allow the center cushion 384 to pivot forward independent of outer cushion 383 when force is applied to towers 316 and 317 by occupant force being applied to the webs.

Figure 9:
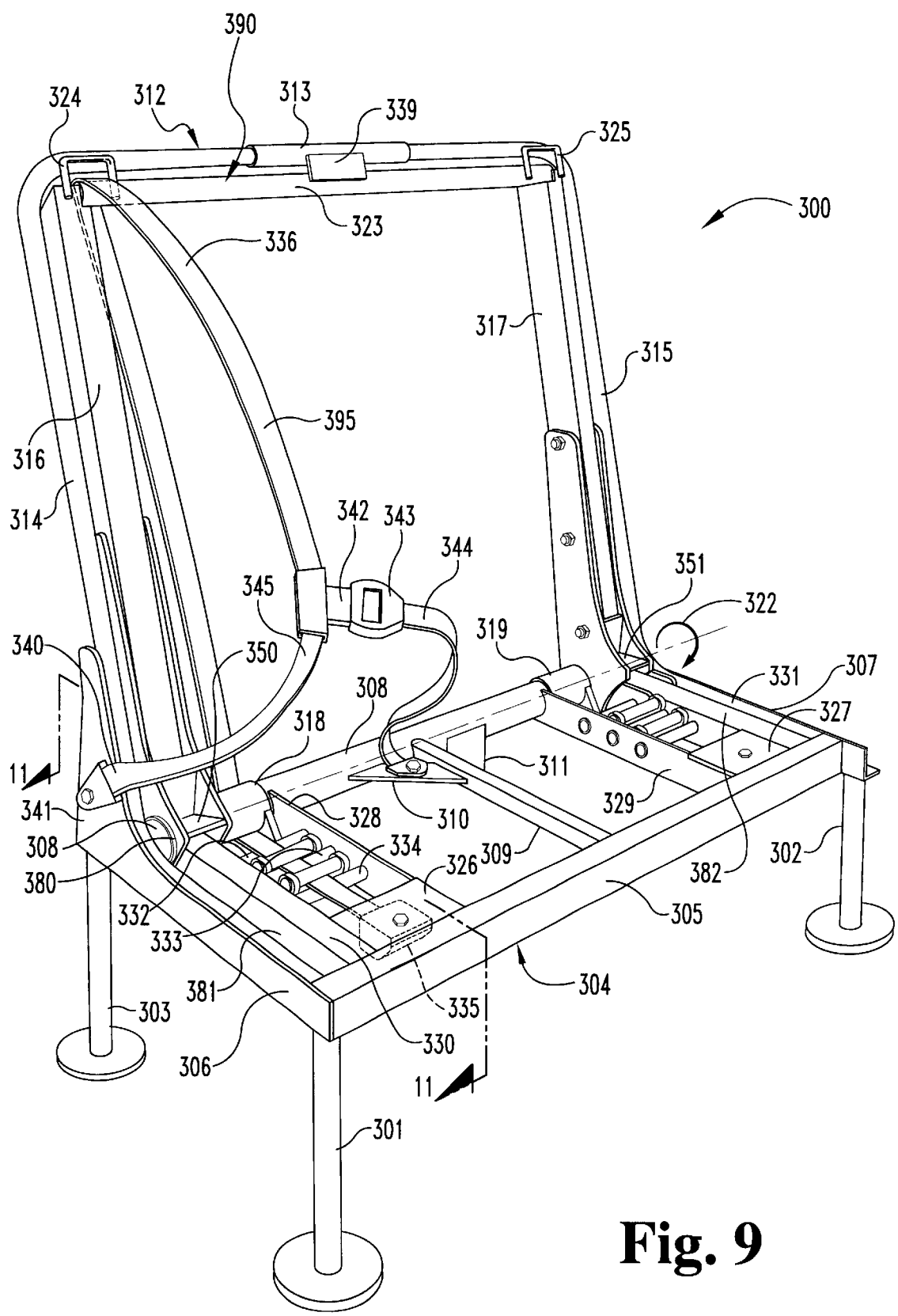
FIG. 9 is a perspective view of the illustrative embodiment of the bench seat frame with a belt slack take-up device.
Figure 10:
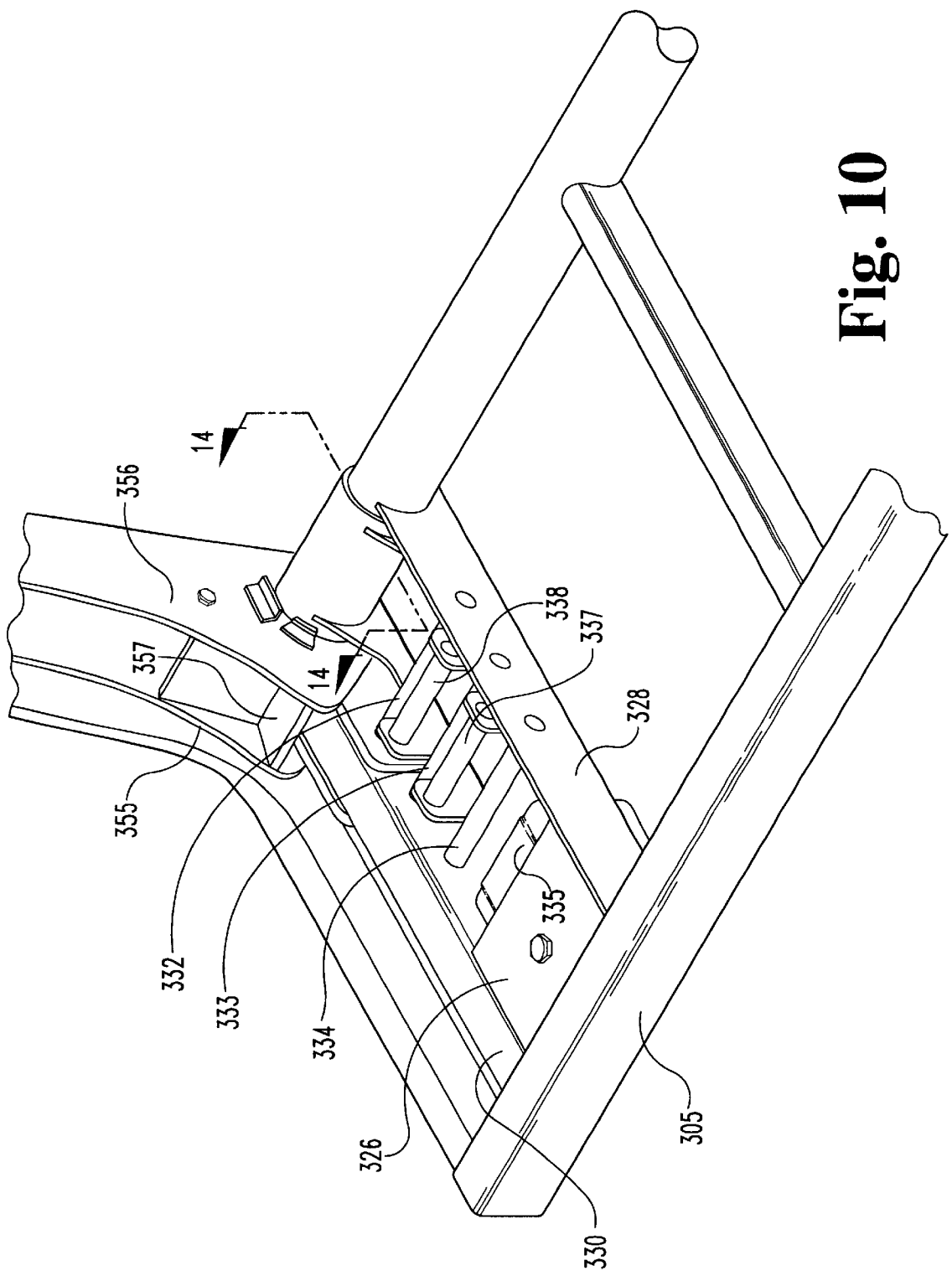
FIG. 10 is a fragmentary enlarged perspective view of the left side of the bench seat frame of FIG. 9.
Figure 16:
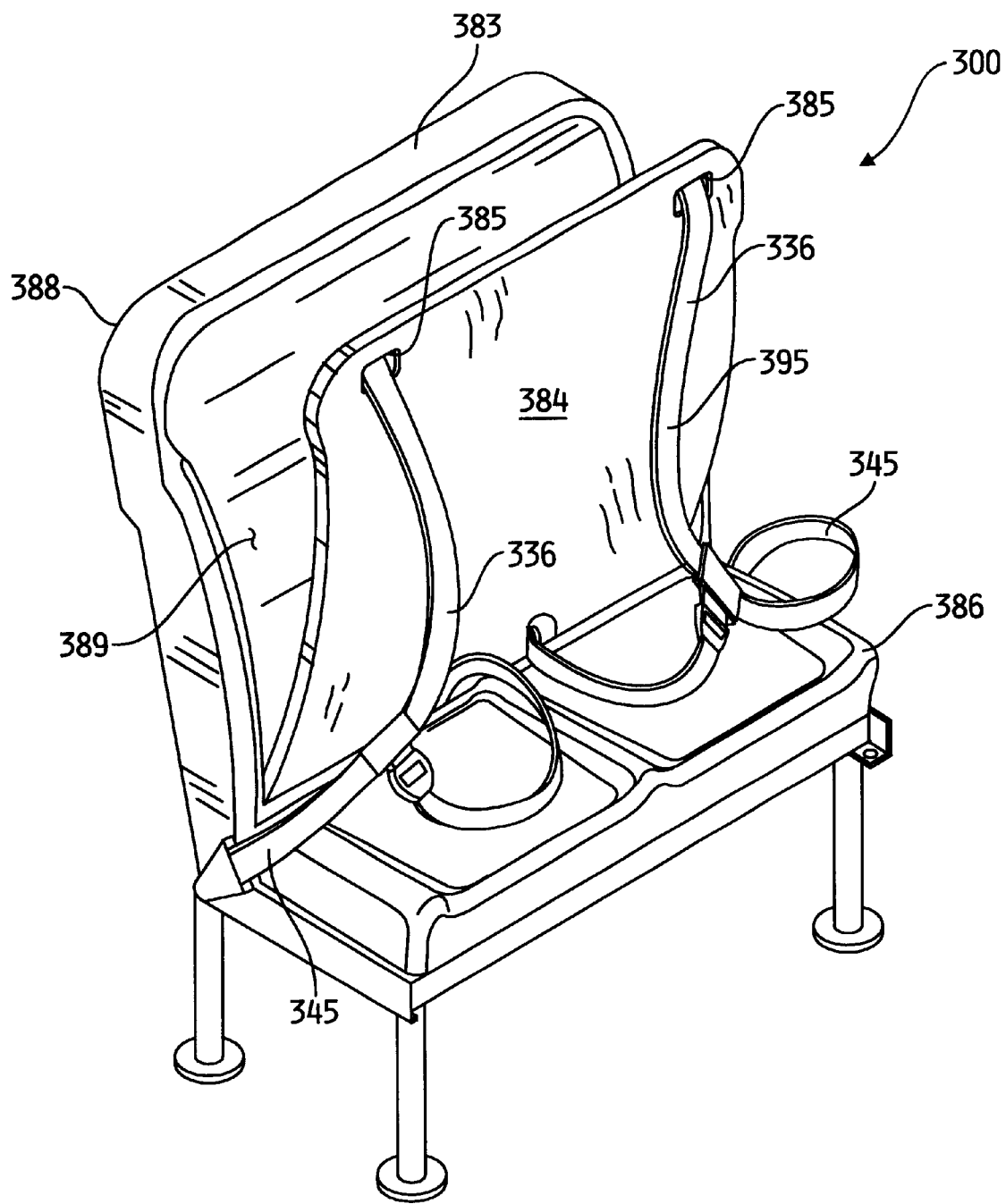
FIG. 16 is a side perspective view of the seats depicted in FIGS. 9 and 15.

FIG. 16 illustrates seat 300, as depicted in FIGS. 9 and 15, with the center cushion 384 pivoted forward of the outer cushion 383. As previously described, the center cushion 384 encloses upwardly extending towers 316 and 317, each tower having a top portion and a bottom portion, and horizontally extending member 323 therebetween, which together form a pivotable third frame 390 for supporting the center cushion 384 and for supporting and guiding the web belt 336 as depicted in FIGS. 9, 15 and 16. The frame 390 together with center cushion 384 form a seat back for supporting a passenger in seat 300, which seat back moves together substantially as a unit as shown in FIG. 16. As described above and depicted in FIGS. 9, 15 and 16, seat cushion 386 encloses frame 304 to form the seat portion or seat bottom for supporting a passenger.

Figure 17:
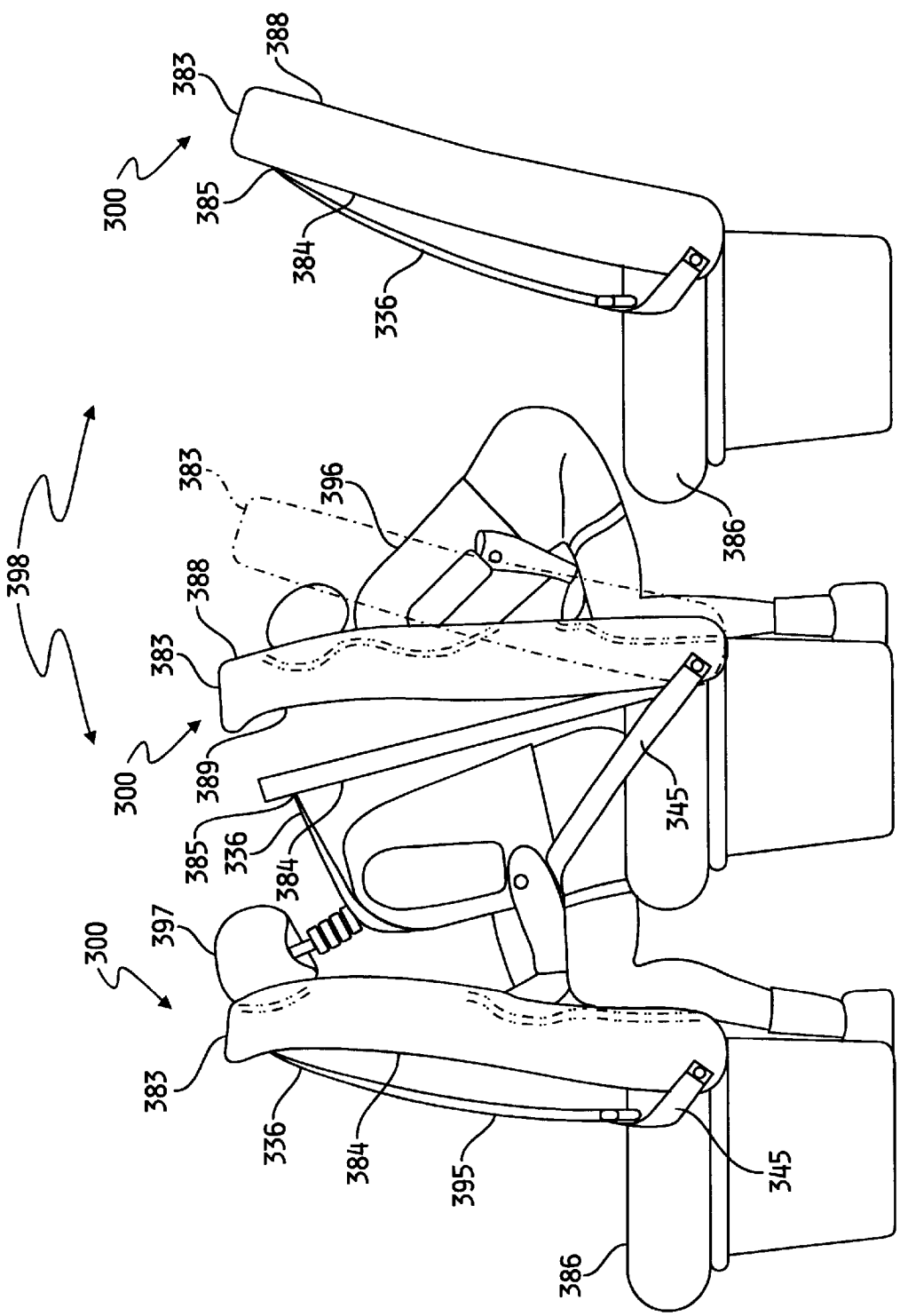
FIG. 17 is a side schematic view of an illustrative embodiment of a system of seats depicted in FIGS. 9 and 15.

Referring to FIG. 17, a system 398 of seats 300, as previously described and depicted in FIGS. 9, 15 and 16, is illustrated with the seats in a longitudinally oriented row. The cushion 383 together with enclosed frame 312, as described and depicted in FIGS. 9 and 15–17, form a passenger restrainer for an unbelted passenger 396 or a belted passenger 397 sitting in any seat 300 situated behind any other seat 300 as depicted in FIG. 17. As illustrated in FIGS. 15 and 16, the cushion 383 has a rearwardly facing surface 388. As illustrated in FIGS. 16 and 17, the cushion 383 also has a forwardly facing surface 389 of the cushion 383 facing forward.

Referring to FIG. 17, the operation of system 398 will be expanded upon. As already noted, when a passenger 396, 397 sitting behind a seat 300 applies a force forwardly toward rearwardly facing surface 388 of seat 300, as in the event of a crash, then the frame portions 314 and 315 of frame 312 deform, thereby absorbing the energy of the forwardly moving passenger 396, 397. As previously explained, if a forwardly moving passenger 397 is wearing a seat belt 336, then the force of a crash will move the passenger 397 against web belt 336 with force sufficient to rupture breakable wall 339, or other frangible retaining means known to one skilled in the art, allowing frame 390 and associated enclosing cushion 384 to pivot forward independent of frame 312 until a stop mechanism, such as previously described stop flanges 350 and 351 in cooperation with contact members 330 and 331, stops the forward movement of frame 390 and cushion 384. As previously noted, although the belt 336 and associated take-up device 360 absorb some of the passenger's 397 forward momentum, it will be appreciated that, depending on the size of belted passenger 397 and the force that passenger 397 applies on the web 336, the passenger 397 may or may not impact surface 388 in a crash. It will also be appreciated that the frangible retaining means 339 may be designed to rupture at varying amounts of force. Also, because the forward movement of frame 390 and cushion 384 is independent of frame 312, frame 312 and associated cushion 383 remain in place to absorb the energy of a passenger 396 or 397, whether belted or not, sitting in the seat behind the seat of a belted passenger 397. The phantom rendition of cushion 383 in FIG. 17 depicts the cushion 383 prior to contact by the fowardly moving passenger 396.

If a passenger 396 is not wearing a belt 336, then a crash will not move the passenger 396 against the web 336 and the retaining means 339 will therefore not break. In such a case, cushion 384 will remain within cushion 383 thereby pivoting forward with frame portions 314 and 315 and cushion 383 in the event that a passenger sitting behind impacts the rearwardly facing surface 388. Similarly, if a passenger sitting behind an empty seat applies forward pressure against the rearwardly facing surface 388 of such an empty seat, then frame 390 and cushion 384 will remain within frame 312 and cushion 383 and will not impede the movement of, but rather, will move forward with, frame portions 314 and 315.

Many advantages flow from use of the preferred embodiment of the invention. For example, webbing from a restrained occupant on seat 300 simultaneously applies load to towers 316 and 317 causing the towers to pivot forward while applying tension load to the entire webbing length. That is, slack is removed from the webbing surrounding the occupant by the downwardly pivoting slack take up devices. Tension of the restraint is therefore increased around the occupant. A large mechanical advantage is provided by the lengths of the towers which exceed the length of the slack take up devices. As the towers pivot downwardly along with bearings 337 and 338, the tension increases proportionately thereby decreasing the occupant forward acceleration rate proportionally. The increasing tension in the lap portion of the web centers the occupant in proper seating position during forward impact movement. Likewise, additional tension in the web controls kinematic motion of the restrained occupant so that the motion is straight during forward motion and straight during rebound motion. The added tension in the web will further cause the occupant to be in proper seating position after the occupant motion is complete.

The system of FIG. 9 will not cause additional stiffness to the seat back when the occupant is unrestrained or the seat is unoccupied and thus, maintains the energy management capability for any unrestrained occupant located behind seat 300. The system preserves the under seat clearance for other vehicle features. Likewise, the system will not require additional structure to the seat back when the restrained or unrestrained occupant is forced rearward into the seat back during impact.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A vehicle passenger seat restraint system comprising:
   a passenger seat frame mounted to a vehicle and having a vertically extending portion,
   a seat for supporting a passenger and having a seat bottom fixedly mounted to the seat frame and a seat back moveably mounted to said seat frame adjacent the vertically extending portion,
   a substantially rigid seat belt supporting member rigidly mounted to said seat back,
   said supporting member having a top portion and a rigid bottom portion,
   wherein said rigid bottom portion and said seat frame define a cooperative stop mechanism, and
   wherein said stop mechanism limits movement of said seat back relative to said seat frame in at least one direction.

2. The seat structure of claim 1, wherein the mounting of the seat back to the seat frame utilizes a pivot connection to allow pivoting of the seat back relative to the seat frame.

3. The seat structure of claim 1, further comprising restraining means on the seat frame to restrain initial movement of the seat back with respect to the seat frame.

4. The seat structure of claim 3, wherein the restraining means is frangible to permit movement of the seat back with respect to the seat frame.

5. The seat structure of claim 1, further comprising a stop for limiting the extent of movement of the seat back relative to the seat frame.

6. The seat structure of claim 5, wherein the stop is defined by cooperating elements on the seat frame and the seat back.

7. The seat structure of claim 1, further comprising a seat belt supported on the seat belt supporting member.

8. The seat structure of claim 7, wherein the seat belt has an end mounted to the seat frame.

9. The seat structure of claim 8, wherein the end is mounted to the seat bottom.

10. The seat structure of claim 7, wherein the seat belt has an end mounted to the seat belt supporting member.

11. A seat structure for mounting a passenger restraint seat belt comprising:
    a seat frame for mounting to a vehicle,
    a rear passenger restrainer rigidly mounted on the seat frame to restrain movement of a rear passenger,
    a seat having a bottom and a seat back carried by the seat frame for supporting a person,
    said seat back mounted to said seat frame, and moveable as a unit away from said seat frame and said rear passenger restrainer,
    a seat belt support fixedly mounted to the seat back and moveable relative to the seat frame and rear passenger restrainer upon movement of said seat back relative to the frame.

12. The seat structure of claim 11, wherein the mounting of the seat back to the seat frame utilizes a pivot connection to allow pivoting of the seat back relative to the seat frame.

13. The seat structure of claim 11, further comprising restraining means on the seat frame to restrain initial movement of the seat back with respect to the seat frame.

14. The seat structure of claim 13, wherein the restraining means is frangible to permit movement of the seat back with respect to the seat frame.

15. The seat structure of claim 11, further comprising a stop for limiting the extent of movement of the seat back relative to the seat frame.

16. The seat structure of claim 15, wherein the stop is defined by cooperating elements on the seat frame and the seat back.

17. The seat structure of claim 11, further comprising a seat belt supported on the seat belt support.

18. The seat structure of claim 17, wherein the seat belt has an end mounted to the seat frame.

19. The seat structure of claim 18, wherein the seat belt end is mounted to the seat bottom.

20. The seat structure of claim 19, wherein the seat belt has an end mounted to the seat frame.

* * * * *